Feb. 27, 1962 — E. J. SANDERS ETAL — 3,022,770
ADJUSTABLE VANED ROTOR ASSEMBLIES
Filed April 8, 1957 — 2 Sheets-Sheet 2
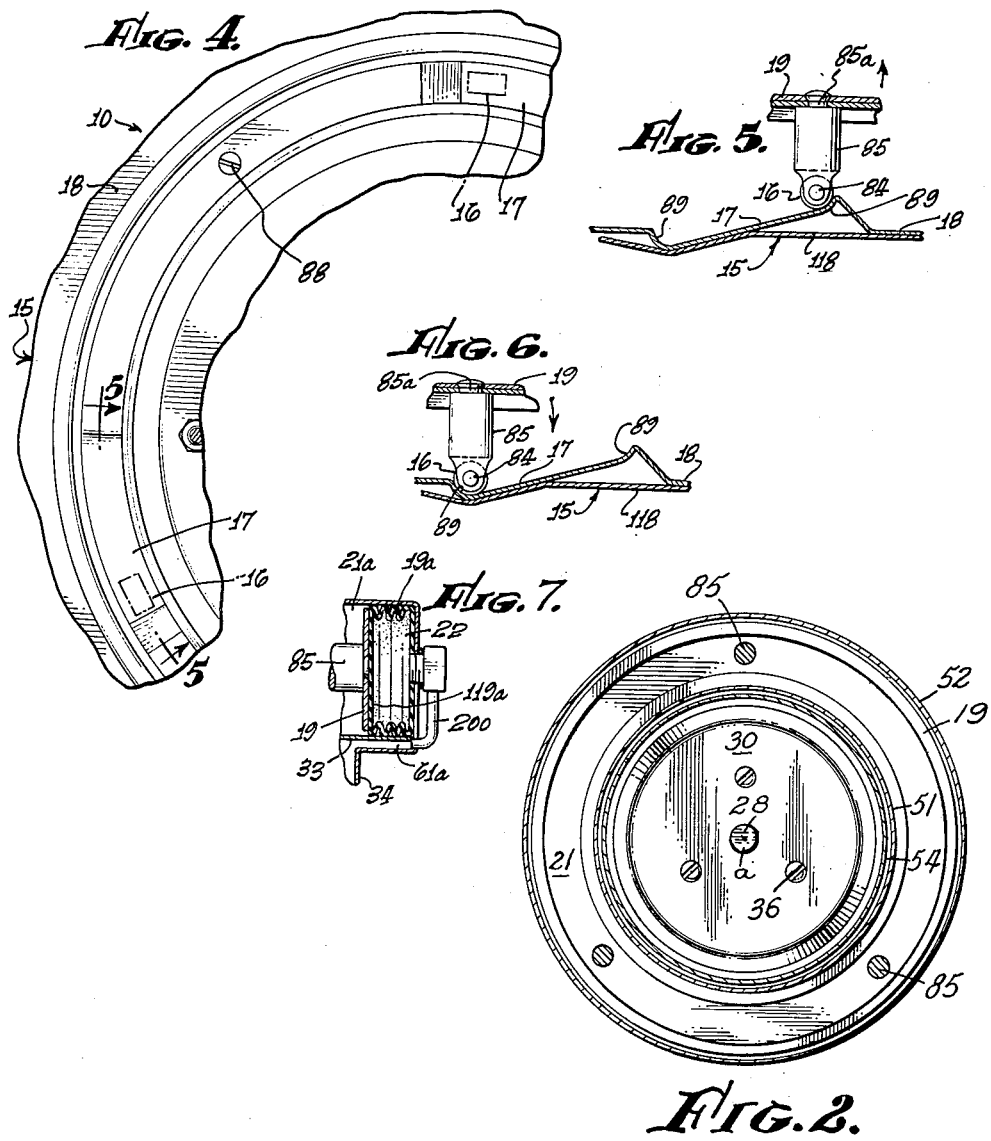
INVENTORS.
ELMORE J. SANDERS,
FREDERICK WINKLER, JR,
ALBERT M. NEYMARK,
By William P. Green
ATTORNEY.

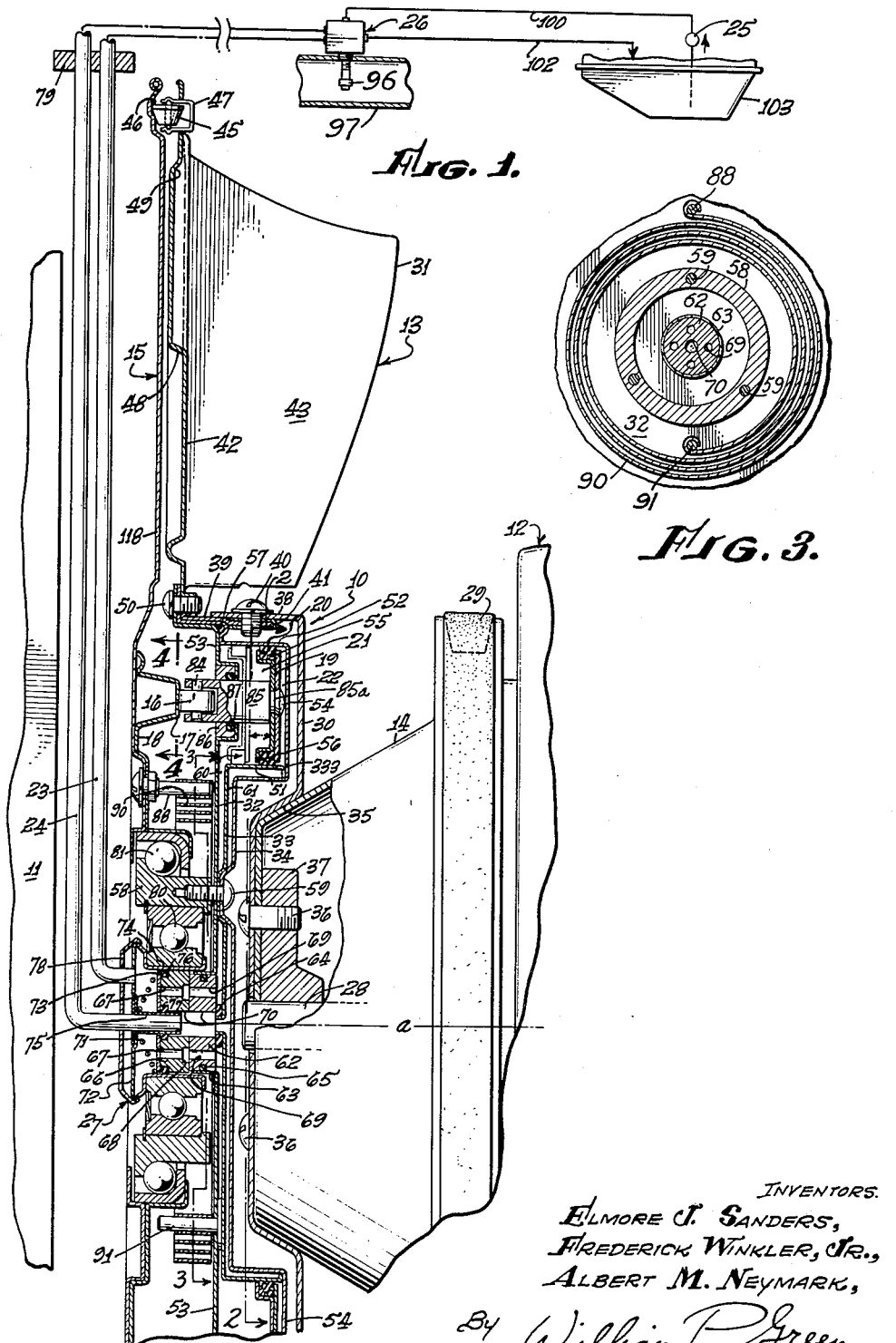

United States Patent Office 3,022,770
Patented Feb. 27, 1962

3,022,770
ADJUSTABLE VANED ROTOR ASSEMBLIES
Elmore J. Sanders, 143 N. Grand St., Orange, Calif., and Frederick Winkler, Jr., Morton Grove, and Albert M. Neymark, Elmwood Park, Ill.; said Winkler, Jr., and Neymark, assignors to said Sanders
Filed Apr. 8, 1957, Ser. No. 651,410
11 Claims. (Cl. 121—38)

This invention relates to improved fluid displacement rotor assemblies, of a type adapted to be used either as a fan for creating a flow of air or other fluid, or as a windmill type device to be itself turned by the movement of such a fluid.

In Patent No. 2,626,743 issued January 27, 1953 to Elmore J. Sanders on Air Displacement Rotor, there has been disclosed a unique type of rotor assembly which is designed for conversion while running between an open fluid-passing condition and a second condition in which the device is closed or partially closed to fluid flow therethrough. To allow for such conversion, the device includes a first section having fluid displacement vanes, and a shutter section turning with the first section but adjustable relative thereto to control the rate of fluid flow through the device. Preferably, the relative adjustment of the two sections is effected by relative rotary movement of the sections about the main axis of rotation of the device.

When a device of this type is to be utilized for high speed operation, one problem encountered is that of designing the adjusting mechanism in a manner such that the high centrifugal forces developed in the device do not resist adjusting movement of the mechanism to a degree requiring excessively high actuating forces for effecting an adjustment. For low speed applications, these centrifugal forces are small enough that they do not present a problem, but for higher speed applications they are sufficiently important to often mark the difference between a commercially practical device and one which is not practical.

In copending application No. 490,781, filed February 28, 1955 by Elmore J. Sanders on "Actuating Mechanism for Variable Flow Fluid Displacement Rotor," (now Patent Number 2,781,167) there is disclosed an actuating or adjusting mechanism which in large part overcomes any adverse effect of centrifugal force in the present type of device. Specifically, the adjusting mechanism of that invention which was preferably a fluid operated type of mechanism, was so designed that none of its various moving parts (except the actuating fluid itself) could possibly tend by centrifugal force to relatively shift the sections in one direction or the other.

The present invention constitutes a further development of the invention of Patent Number 2,781,167, in which the mechanism is so designed that even the weight of the pressure fluid itself is, at least in large part, dynamically in balance in a manner preventing any great tendency for this fluid to actuate the mechanism by centrifugal force. While this factor may be insignificant when the fluid is air or similar light gas, the elimination or minimizing of a tendency for centrifugal actuation by the fluid may be of very substantial importance where the fluid is a relatively heavy liquid. In order to minimize this tendency, we utilize as the fluid operated mechanism a unit in which a piston or other equivalent movable wall structure (such as a diaphragm or bellows assembly) is designed to be positively fluid actuated in either of two opposite directions, as by providing fluid on opposite sides of a piston or the like. This mechanism turns with the rotor assembly, and by virtue of such provision of two bodies of fluid acting oppositely against the piston or movable wall structure, one body of fluid essentially balances the other body to largely cancel out their centrifugal effects. Desirably, the piston or movable wall, and the cylinder or other body structure within which it is mounted, are both annular and centered about the axis of rotation of the device, to further assure optimum balance conditions about that axis. Fluid may be delivered to and from the two pressure chambers of the apparatus through two conduits leading from swivel inlet and outlet fittings near the axis of the device. The movement of the movable wall structure may be translated into relative rotary adjusting movement between the vaned section of the device and the shutter section by means of a cam mechanism similar to that utilized in Patent Number 2,781,167.

The above and other features and objects of the present invention will be better understood from the following detailed description of the typical embodiment illustrated in the accompanying drawings in which:

FIG. 1 is a fragmentary vertical section taken diametrically through an engine cooling fan assembly constructed in accordance with the invention;

FIG. 2 is a section taken on line 2—2 of FIG. 1;

FIG. 3 is a section taken on line 3—3 of FIG. 2;

FIG. 4 is a fragmentary transverse section taken on line 4—4 of FIG. 1;

FIG. 5 is a fragmentary view of the cam mechanism, taken on line 5—5 of FIG. 4, and showing the cam elements in their FIG. 1 open shutter condition;

FIG. 6 is a view corresponding to FIG. 5, but showing the cam elements in their closed shutter positions; and FIG. 7 is a fragmentary view showing a variational form of fluid pressure responsive actuating element.

In FIGS. 1–6, I have shown a preferred form of fluid displacement rotor mechanism 10 embodying the invention, which mechanism may be utilized either as a fluid moving unit such as a fan, or as a turbine or windmill type of vaned structure adapted to be rotatively driven by a flow of moving fluid. The particular form of the invention which is illustrated in the drawings is in certain respects especially desirable for use as an engine cooling fan, for drawing air rearwardly through the water cooling radiator 11 of an internal combustion engine, fragmentarily represented at 12, and will therefore be referred to hereinafter as a fan.

The variable flow fan assembly 10 includes a rear vaned fan section 13 carried by and rotatable with the usual fan driving hub 14 of the engine, and a forward rotatable shutter section 15 mounted for rotation with and relative to the rear section (see Patent Number 2,781,167). Fan section 13 carries several (preferably three) axially movable cam elements 16, which co-act with three circularly spaced cam portions 17 of an essentially annular and essentially radially extending sheet metal plate 18 of shutter section 15, to rotatively adjust section 15 relative to section 13 as a result of axial movement of cam elements 16. The cam elements 16 are actuable axially by movement of an annular axially movable and radially extending piston 19, which is contained within an annular cylinder 20 formed by section 13. Actuating fluid is delivered to and from the front and rear annular chambers 21 and 22 of cylinder 20 through a pair of stationary feed lines 23 and 24 leading from a suitable pressure fluid source, as from the usual lubricating oil pump 25 and a thermostatic control valve 26, with lines 23 and 24 leading to a swivel seal assembly 27 which communicates with chambers 21 and 22. Hub 14 is carried by the usual fan driving shaft 28, which is driven by the engine through a V-belt 29.

Each of the two sections 13 and 15 of the rotor device is formed essentially of a number of circular or annular rigid parts, mostly sheet metal stampings designed especially for facility of manufacture and assembly. The rear vaned section, for instance, includes a circular mounting plate 30 attachable to the forward end of the driving hub 14, a radially outer essentially annular vaned plate 31, and three circular inner plates 32, 33 and 34. Mounting plate 30 has a central rearwardly facing circular recess 35 formed to receive driving hub 14, and attachable to that hub by bolts 36 threadedly connectible into a shaft carried flange member 37. It is contemplated that the formation of this attaching plate 30 may be varied to permit attachment of the device to driving hubs of various designs while the rest of the mechanism remains unchanged. Element 30 extends radially outwardly from its central recessed attaching portion 35, and then axially at an outer location to form a cylindrical outer mounting portion 38 to which the rest of the fan device may be attached as a unit. To permit such attachment, plate 31 has an annular axially extending portion 39 which is receivable within the outer cylindrical portion 38 of the mounting element 30, and is threadedly and removably connected thereto by circularly spaced screws 40 extending through openings in the mounting element, and threadedly connected into registering openings in part 31 and carries nut elements 41.

Outwardly beyond its portion 38, the outer vaned annular member of section 13 has a portion 42 extending substantially directly radially outwardly with respect to the main axis $a$ of the device. This radial portion 42 is cut and deformed at angularly spaced locations to form a series of spaced fan blades or vanes 43 extending angularly to the rear and acting to induce a rearward flow of air through the device when rotated.

At its outer edge, plate 31 may carry a spacer or spacers, typically a number of circularly spaced rollers 45 which are engageable within an annularly recessed portion 46 of the main sheet metal member 18 of shutter section 15 to hold the radially outer portions of the fan and shutter sections 13 and 15 in the illustrated spaced relation. Rollers 45 may be rotatably mounted to element 31 by means of individual U shaped mounting brackets 47 which are suitably welded or othrewise attached to element 31 and between whose spaced parallel arms the rollers 45 are rotatably carried. Each roller 45 may have a pair of projections at its opposite sides receivable within small indentations in the arms of U shaped member 47, to mount rollers 45 for the desired rotary movement relative to members 57, and about axes which extend directly radially outwardly with respect to axis $a$ of the device. The spaced arms of each U shaped member 47 may be resilient and tend to move relatively together, to effectively hold the associated roller 45 between its arms. The material of element 31 may be suitably deformed as at 48 or 49, to present small ribs or corrugations acting to strengthen the material of member 31.

Parts 32 and 34 of the fan section 13 are peripherally attached to the inner portion of vaned element 31 by a number of circularly spaced screws 50. Inwardly of their point of attachment to member 31 by screws 50, members 32 and 34, and the intermediate part 33, form the previously mentioned annular cylinder 20, having cylindrical inner and outer walls 51 and 52 formed by parts 32 and 33, and having radial end walls 53 and 54 formed by parts 33 and 34. The annular piston 19 within this cylinder may be formed of two interconnected annular plates, as shown, having annular rubber O-rings or seal rings 55 and 56. Outwardly beyond cylinder 20, a seal ring 57, centered about axis $a$, may be provided between parts 32 and 34. The three plates 32, 33 and 34 are rigidly attached together and to a front bearing ring 58 by means of several circularly spaced screws 59, with the plates being spaced axially apart except at the locations of the screws to provide between the plates an essentially annular narrow radially extending passage 60 for leading actuating fluid outwardly to chamber 21 in front of piston 19, and a second and similar passage leading to chamber 22 behind piston 19 through a number of cutaway portions 333 formed in the periphery of part 33 adjacent part 34. As will be apparent, the localized dimpling of plates 33 and 34 at screws 59 provides for such spacing, and the screws are tightened sufficiently against the plates to assure against any leakage of fluid from passages 60 and 61 past the screws.

Pressure fluid flows to and from passages 60 and 61 from stationary lines 23 and 24 through the double swivel connection 27 which is located at the center of the rotor mechanism and is centered about axis $a$. This connection includes a ring 62 which is confined within an axially extending portion 63 of part 32 for rotation therewith, and which is sealed with respect to parts 32 and 33 by two annular seal rings 64 and 65 of rubber or the like. A ring 66 which normally does not rotate contains circularly spaced fluid passages 67 merging into an annular groove 68 which communicates with circularly spaced passages 69 in ring 62 leading to passage 60. At their centers, rings 62 and 66 contain communicating central passages 70 leading to passage 61. Ring 66 is urged against ring 62 in fluid tight sealing relation by means of a spiral coil spring 71, which may bear at one end against a stationary plate 72 and at the other end against a metal backing plate 73 on ring 66. Rings 62 and 66 are of course formed of suitable material for forming an effective seal between these parts confining the fluid flow to the desired passage. For instance both of these rings may be formed of carbon.

In addition to the above discussed parts, swivel assembly 27 includes an annular axially extending outer part 74, a tubular axially extending central element 75 annularly connected to plate 72 and into which line 24 connects, two seal rings 76 and 77 for preventing fluid leakage between parts 66 and 74, and between parts 66 and 75, and an outer plate 78 which is peripherally crimped over parts 72 and 74 in fluid tight relation. Line 23 extends through openings in parts 78 and 72, to communicate with the space at the forward side of ring 66, and thus to communicate with passages 67. Lines 23 and 24 are in some manner positively held against rotation, as by rigid attachment to a stationary support member typically represented at 79. It will of course, be understood that all of the various rings or parts 62, 64, 65, 66, 72, 73, 74, 75, 76, 77 and 78 are circular or annular and are centered about axis $a$.

The stationary member 74 and the various associated swivel parts are centered within the rotating fan mechanism by means of an inner ball bearing assembly 80, the outer race of which is received within annular member 58. At the radially outer side of part 58, there is provided a second ball bearing assembly 81, of the combined thrust and centering type, which mounts shutter section 15 for rotary adjusting movement about axis $a$.

The main sheet metal part 118 of forward shutter section 15 is essentially annular and extends radially in very closely spaced relation to vaned element 31 of the fan section 13. In accordance with the teaching of Patent No. 2,781,167, shutter section 15 is rotatable relative to fan section 13 about axis $a$ through a predetermined angle (preferably 22½ degrees) between an open position in which air may pass axially through the device and a closed position in which such air flow is closed off.

Shutter section 15 is rotatively actuated relative to section 13 between open and closed positions by axial movement of the previously mentioned evenly circularly spaced cam elements 16. These elements 14 may comprise three rollers which are mounted by pins 84 to the bifurcated ends of three axially extending cylindrical piston rods 85 for individual rotation about three circularly spaced axes extending directly radially outwardly from the main axis $a$ of the apparatus. Piston rods 85 are rigidly attached at their rear ends to piston 19, as by extending their reduced portions 85a through apertures in the piston and then upsetting or peening over those ends in fluid tight sealing relation. Each of the rods 85 extends through and is axially movable within an associated bushing ring 86 carried by part 32, with a fluid seal being provided by a rubber O-ring 87.

Cam rollers 16 act against the annular part 18, which is attached by circularly spaced screws 88 to plate 118. Part 18 extends inwardly to co-act with element 118 in embracing the shutter mounting bearing assembly 81. Part 17 is deformed to provide three evenly circularly spaced cam surfaces or portions 18 for engagement by the three cam rollers 16 respectively. As seen best in FIGURES 5 and 6, these cam surfaces face axially toward the rollers, and are so shaped as to advance axially as they extend circularly about the main axis $a$. Stop shoulders 89 are formed at opposite ends of cam surfaces 18, for limiting the angular displacement of shutter section 15 relative to vaned section 13.

In the FIGURE 1 position of piston 19, cam rollers 16 are in the positions represented in FIGURE 5, and the shutter is in its open position relative to fan section 13. In this condition of the shutter, the fan vanes 43 act to draw air through apertures in the shutter. The piston is held in this condition by the maintenance of a greater fluid pressure in forward chamber 21 of cylinder 20 than in rear chamber 22. If the pressure conditions are then reversed, the piston moves forwardly to the broken line position of FIGURE 1, to actuate cam rollers 16 axially to the position represented in FIGURE 6. Such axial movement of rollers 16 acts to cam shutter section 15 circularly through 22½ degrees, where eight vanes are provided, by virtue of the camming action of the inclined arcuate roller engaged surfaces 18 to thus shift shutter section 15 to the fully closed position relative to vaned section 13. In this condition, the shutter closes off substantially all axial flow of fluid through the device. When the fluid pressure is again reversed, the piston returns to its FIGURE 1 full line position, and section 15 is then returned to and held in its opened position by means of a flat coil spring 90 which is rigidly attached at one end to a pin 91 fixed to parts 32 and 33, and at the other end to an inner end of one of the screws 88. This coil spring extends annularly within a space between the parts 32 and 18.

Referring to FIG. 1, the delivery of pressurized lubricating oil from pump 25 to cylinder 20, for actuating piston 19, is controlled by a thermostatic valve assembly 26, which is actuated by a conventional thermostatic unit 96. The thermostatic unit may project into a cooling water line 97 to contact and be controlled by the water which flows through radiator 11 which cools engine 12. The two lines 23 and 24 leading to the fan mechanism are connected into one side of the valve body, and communicate with valve assembly 26. Line 100 from pump 25 is connected into another side of the valve body, and a return line 102 for leading fluid back from the valve to crankcase 103 (from which the pump takes suction) is also connected to the valve.

Valve 26 is thermostatically actuable to reverse the fluid connections to the fan assembly. Specifically, in a lower temperature condition of the valve, fluid from pump 25 is passed by valve 26 into line 24, while line 23 is placed in communication with return line 102, so that high pressure fluid flow through passages 70 and 61 to the rear side 22 of piston 19, and fluid is returned from the forward side 21 of the piston through passages 60, 69, 67, line 23, and line 102 to the crankcase. This then actuates piston 19 to its broken line position, to relatively cam section 15 to its closed position in which the flow of cooling air through radiator 11 is substantially shut off. The resulting elevation in water temperature ultimately causes thermostat 96 to actuate valve 26 to a second condition. This reverses the fluid connections through the valve, returns piston 19 to its FIGURE 1 full line position, and allows return of section 15 to its opened position in which cooling of the radiator water is resumed until a further change in temperature sufficient to actuate the valve. Thus, the fan assembly and thermostatic valve act to constantly maintain a desired optimum cooling water temperature.

FIGURE 7 represents fragmentarily a variational form of the invention, which is identical with that of the other figures except for the substitution of an axially expansible fluid tight annular bellows 19a for the piston 19 of the first form of the invention. As will be apparent from the drawing, this bellows 19a has inner and outer annular walls which are rendered axially flexible by forming them with a number of annular corrugations. Axial expansion of the movable wall 119a of the bellows of course serves to actuate the associated cam parts in the same manner as does axial movement of piston 19 in FIGURES 1 to 9. The pressure fluid may be fed to the forward side 21a of the bellows in the same manner as in FIG. 1, and may be fed to the rear side 22a (interior of the bellows) through a line 200 leading from passage 61a to the inside of the bellows. The cutaways 333 in part 33 are of course eliminated in FIG. 7.

In each form of the invention, the piston or bellows and associated camming parts are centered about the axis $a$ and are movable axially in a manner such that they do not tend to move in either direction as a result of centrifugal force developed by these parts. Also, since pressure fluid is positioned at both sides of the piston or bellows, the centrifugal force developed by movement of this fluid is balanced out, and has a minimum effect tending to actuate the parts in either direction. Thus, the apparatus can be run at extremely high speeds, and at such high speeds can be freely actuated by the pressure fluid between its opened and closed conditions, without interference as a result of centrifugal force.

When the shutter of either form of the invention is in closed condition, the fan ceases to draw cooling air rearwardly through the radiator 11, and instead sets up a secondary circulation of air within the engine compartment. Specifically, when the shutter is closed, the fan commences to operate as a centrifugal impeller, which draws warm air forwardly from over the engine to the radially inner portions of vanes 43, which vanes then discharge the air radially outwardly. The air thus set in motion circulates about the engine, and some of the radially outwardly impelled air may be deflected forwardly by a suitable shroud toward the radiator to keep it warm.

We claim:

1. A rotor assembly including a structure rotatable about an axis, said structure including three sheet metal plates having radially outer portions forming an annular compartment turning about said axis and centered about but spaced outwardly from said axis, an essentially annular wall in said compartment dividing it into two annular chambers centered about said axis and each containing an actuating fluid, said wall being movable in opposite axial directions in the compartment to relatively inversely vary the effective sizes of the two chambers and being movable in opposite axial directions by fluid pressure in said two chambers respectively while said structure turns about said axis, and said three sheet metal plates having portions radially inwardly of said compartment forming between the plates radially extending passages for leading pressure fluid to and from said two chambers selectively, while said structure turns, to thereby move said wall in said compartment.

2. A rotor assembly comprising a first section rotatable about an axis, a second section rotatable with the first section and adapted to be rotatably adjusted relative to the first section, means forming a pair of chambers rotating with said sections and each containing an actuating fluid, said means including wall means forming a side of each of said chambers and movable axially relative to other portions of the chambers and operable by said movement to relatively inversely vary the effective sizes of the chambers, said wall means being movable in a first axial direction by fluid pressure in a first of said chambers, and being movable in a second axial direction by fluid pressure in the second chamber, an actuating connection operable upon movement of said wall means in said first axial direction to rotate one of said sections in a first rotary direction relative to the other, means yieldingly urging said one section rotatively in the opposite rotary direction relative to said other section, said actuating connection being constructed to exert axial force against said wall means in said second axial direction in response to the rotary force exerted against said one section in said opposite rotary direction by said yielding means, and fluid conducting means operable to lead pressure fluid selectively to either said first chamber to actuate said wall means in said first axial direction or said second chamber to urge the wall means in said second axial direction in which it is urged by said yielding means through said actuating connection.

3. A rotor assembly as recited in claim 2, in which said actuating connection includes a cam track on said one section, and a part movable axially with said wall means and engaging said cam track in a relation to relatively rotatably adjust said sections in response to axial movement of said wall means.

4. A rotor assembly as recited in claim 2, in which said yielding means include a spring turning with the section and yieldingly urging said one section in said opposite direction relative to said other section.

5. A rotor assembly as recited in claim 2, in which said two chambers are both annular and are centered about said axis of rotation.

6. A rotor assembly as recited in claim 2, in which said fluid conducting means include two swivel fluid passing connections centered about said axis and communicating with the two chambers respectively.

7. A rotor assembly as recited in claim 2, in which said chamber forming means include means turning with said sections and containing a compartment, said wall means comprising a wall forming an axially shiftable partition dividing the compartment into said two chambers.

8. A rotor assembly comprising a first section rotatable about an axis, a second section rotatable with the first section and adapted to be rotatably adjusted relative to the first section, means forming a pair of chambers rotating with said sections and each containing an actuating fluid, said means including wall means forming a side of each of said chambers and movable axially relative to other portions of the chambers and operable by said movement to relatively inversely vary the effective sizes of the chambers, said wall means being movable in a first axial direction by fluid pressure in a first of said chambers, and being movable in a second axial direction by fluid pressure in the second chamber, an actuating connection operable upon movement of said wall means in said first axial direction to rotate one of said sections in a first rotary direction relative to the other, means yieldingly urging said one section rotatively in the opposite rotary direction relative to said other section, said actuating connection being constructed to exert axial force against said wall means in said second axial direction in response to the rotary force exerted against said one section in said opposite rotary direction by said yielding means, and fluid conducting means operable to lead pressure fluid selectively to either said first chamber to actuate said wall means in said first axial direction or said second chamber to urge the wall means in said second axial direction in which it is urged by said yielding means through said actuating connection, said chamber forming means including means turning with said sections and containing an annular compartment centered about said axis of rotation, said wall means comprising an annular wall within said compartment forming an axially shiftable partition dividing the compartment into said two chambers, said chambers each being annular and centered about said axis.

9. A rotor assembly comprising a first section rotatable about an axis, a second section rotatable with the first section and adapted to be rotatably adjusted relative to the first section, means forming a pair of chambers rotating with said sections and each containing an actuating fluid, said means including wall means forming a side of each of said chambers and movable axially relative to other portions of the chambers and operable by said movement to relatively inversely vary the effective sizes of the chambers, said wall means being movable in a first axial direction by fluid pressure in a first of said chambers, and being movable in a second axial direction by fluid pressure in the second chamber, actuating means operable upon movement of said wall means in said first axial direction to rotate one of said sections in a first rotary direction relative to the other section, and operable upon movement of said wall means in said second axial direction to rotate said one section in the opposite rotary direction relative to said other section, and fluid conducting means operable to lead pressure fluid selectively either to said first chamber, to actuate said wall means in said first axial direction and thereby to actuate said one section relative to the other section in said first rotary direction, or to said second chamber, to actuate said wall means in said second axial direction and thereby to actuate said one section relative to the other section in said second rotary direction.

10. A rotor assembly as recited in claim 9, in which said actuating means include a cam track on said one section, and a part movable axially with said wall means and engaging said cam track in a relation to relatively rotatably adjust said sections in response to axial movement of said wall means.

11. A rotor assembly comprising a first section rotatable about an axis, a second section rotatable with the first section and adapted to be rotatably adjusted relative to the first section, means forming a pair of chambers rotating with said sections and each containing an actuating fluid, said means including wall means forming a side of each of said chambers and movable axially relative to other portions of the chambers and operable by said movement to relatively inversely vary the effective sizes of the chambers, said wall means being movable in a first axial direction by fluid pressure in a first of said chambers, and being movable in a second axial direction by fluid pressure in the second chamber, actuating means operable upon movement of said wall means in said first axial direction to rotate one of said sections in a first rotary direction relative to the other section, and operable upon movement of said wall means in said second axial direction to rotate said one section in the opposite rotary direction relative to said other section, and fluid conducting means operable to lead pressure fluid selectively either to said first chamber, to actuate said wall means in said first axial direction and thereby to actuate said one section relative to the other section in said first rotary direction, or to said second chamber, to actuate said wall means in said second axial direction and thereby to actuate said one section relative to the other section in said second rotary direction, said chamber forming means including means turning with said sections and containing an annular compartment centered about said axis of rotation, said wall means comprising an annular wall within said compartment forming an axially shiftable partition dividing the compartment into said two chambers, said chambers each being annular and centered about said axis.

References Cited in the file of this patent
UNITED STATES PATENTS

| | | |
|---|---|---|
| 1,311,665 | Peck | July 29, 1919 |
| 1,327,381 | Furber | Jan. 6, 1920 |

(Other references on following page)

UNITED STATES PATENTS

| | | |
|---|---|---|
| 1,851,723 | Neidow | Mar. 29, 1932 |
| 2,045,870 | Paton | June 30, 1936 |
| 2,415,181 | Johnson | Feb. 4, 1947 |
| 2,428,452 | Farmer | Oct. 7, 1947 |
| 2,472,728 | Sanders | June 7, 1949 |
| 2,487,117 | Eaton | Nov. 8, 1949 |
| 2,626,743 | Sanders | Jan. 27, 1953 |
| 2,626,744 | Sanders | Jan. 27, 1953 |
| 2,637,308 | Dodge | May 5, 1953 |
| 2,642,959 | Freer | June 23, 1953 |
| 2,658,400 | Dodge | Nov. 10, 1953 |
| 2,661,148 | Englander | Dec. 1, 1953 |
| 2,781,167 | Sanders | Feb. 12, 1957 |
| 2,840,316 | Herbenar | June 24, 1958 |